US012643229B2

(12) United States Patent
Morita et al.

(10) Patent No.: US 12,643,229 B2
(45) Date of Patent: Jun. 2, 2026

(54) CONTROL APPARATUS, CONTROL METHOD, AND PROGRAM

(71) Applicant: Sony Interactive Entertainment Inc., Tokyo (JP)

(72) Inventors: Satoshi Morita, Tiba (JP); Masayoshi Mizuno, Tokyo (JP); Norio Nagatsuka, Saitama (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 44 days.

(21) Appl. No.: 18/841,739

(22) PCT Filed: Mar. 16, 2022

(86) PCT No.: PCT/JP2022/011760
§ 371 (c)(1),
(2) Date: Aug. 27, 2024

(87) PCT Pub. No.: WO2023/175751
PCT Pub. Date: Sep. 21, 2023

(65) Prior Publication Data

US 2025/0162142 A1     May 22, 2025

(51) Int. Cl.
*B25J 9/16*          (2006.01)
*B25J 13/08*         (2006.01)
*B25J 19/02*         (2006.01)

(52) U.S. Cl.
CPC ............. *B25J 9/1615* (2013.01); *B25J 13/08* (2013.01); *B25J 19/027* (2013.01)

(58) Field of Classification Search
CPC ........ B25J 9/1615; B25J 13/08; B25J 19/027; B25J 9/1694; B25J 5/00
See application file for complete search history.

(56) References Cited

U.S. PATENT DOCUMENTS

| | | | | |
|---|---|---|---|---|
| 5,006,999 A * | 4/1991 | Kuno | .................. | G05B 19/425 |
| | | | | 219/124.34 |
| 2007/0267994 A1 | 11/2007 | Sugihara | | |
| 2016/0214257 A1* | 7/2016 | Sejimo | ..................... | B25J 13/08 |
| 2020/0114518 A1* | 4/2020 | Allmendinger | ........ | B25J 9/1697 |
| 2020/0338725 A1 | 10/2020 | Yutaka et al. | | |
| 2022/0016770 A1* | 1/2022 | Matsuoka | .............. | B25J 9/1687 |

(Continued)

FOREIGN PATENT DOCUMENTS

| | | |
|---|---|---|
| JP | 2006068871 A | 3/2006 |
| WO | 2006025616 A1 | 3/2006 |

(Continued)

OTHER PUBLICATIONS

International Search Report for corresponding PCT Application No. PCT/JP2022/011760, 4 pages, dated May 31, 2022.

*Primary Examiner* — Adam R Mott
*Assistant Examiner* — Sagar Kc
(74) *Attorney, Agent, or Firm* — Kilpatrick Townsend & Stockton LLP

(57) ABSTRACT

A control apparatus including a processor is provided that executes an operation in accordance with a program, in which the operation includes generating, on the basis of first sampling data with a rotation angle of a joint section recorded with a first period, second sampling data with the rotation angle recorded with a second period longer than the first period.

20 Claims, 8 Drawing Sheets

(56)                    References Cited

U.S. PATENT DOCUMENTS

| | | | |
|---|---|---|---|
| 2022/0026920 A1* | 1/2022 | Ebrahimi Afrouzi | ....................... G06N 3/0495 |
| 2022/0088802 A1* | 3/2022 | Kanada | ................ G06Q 20/203 |
| 2022/0126461 A1* | 4/2022 | Tanaka | .................. G01L 5/0061 |
| 2022/0161851 A1* | 5/2022 | Nishioka | .................. G01D 5/16 |
| 2022/0184810 A1* | 6/2022 | Beck | ...................... B25J 9/1692 |
| 2023/0131202 A1* | 4/2023 | Lee | ....................... B25J 13/006 700/245 |

FOREIGN PATENT DOCUMENTS

| | | | |
|---|---|---|---|
| WO | 2019142229 A1 | 7/2019 | |
| WO | 2019144429 A1 | 8/2019 | |
| WO | 2021060121 A1 | 4/2021 | |

* cited by examiner

F I G . 2
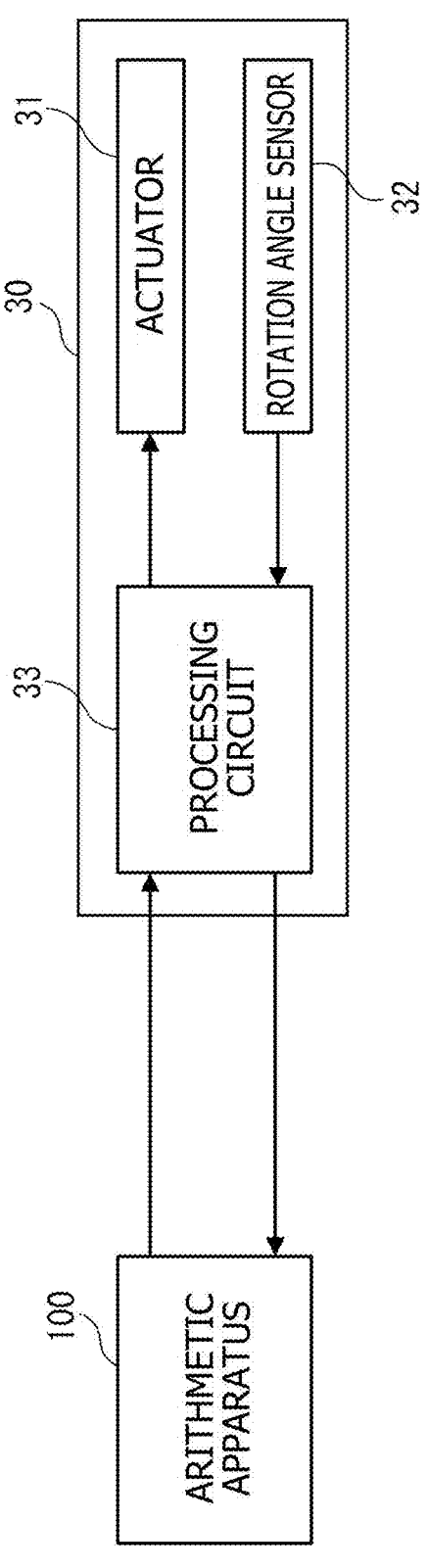

CONTROL APPARATUS, CONTROL METHOD, AND PROGRAM

TECHNICAL FIELD

The present invention relates to a control apparatus, a control method, and a program.

BACKGROUND ART

For control of rotational driving of a joint section of a robot or the like, executing feedback control with reference to a detected value such as a rotation angle of the joint section is known. For example, PTL 1 describes a control apparatus including a detected value acquisition section that acquires at least one detected value indicating a state of a mobile body with a driving section, a control parameter selection section that selects at least some of control parameters for the driving section on the basis of the at least one detected value, and a driving control section that determines a control input value for the driving section by using the selected control parameters.

CITATION LIST

Patent Literature

[PTL 1] PCT Patent Publication No. WO2021/060121

SUMMARY

Technical Problem

In the technology described above, the rotation angle of the joint section is detected by a rotation angle sensor such as an encoder attached to the joint section, and a detected value is transmitted to an arithmetic apparatus that executes a calculation for controlling the robot. Besides the encoder, a potentiometer, a magnetic sensor, or the like is used as a rotation angle sensor. However, in any case, the detected value may have reduced accuracy due to an environmental factor or aging. In a solution against such reduced accuracy, the rotation angle sensor itself may be provided with increased accuracy and durability. However, for example, in the robot, a rotation angle sensor is attached to each of a large number of joint sections. Accordingly, for example, in terms of costs, increasing the performance of the rotation angle sensor is not easy.

Thus, an object of the present invention is to provide a control apparatus, a control method, and a program that enable improvement in the accuracy of the value of the rotation angle obtained on the basis of the detected value from the rotation angle sensor without the need to increase the performance of the rotation angle sensor itself.

Solution to Problem

A certain aspect of the present invention provides a control apparatus including a processor that executes an operation in accordance with a program, in which the operation includes generating, on the basis of first sampling data with a rotation angle of a joint section recorded with a first period, second sampling data with the rotation angle recorded with a second period longer than the first period.

Another aspect of the present invention provides a control method including, by an operation executed by a processor in accordance with a program, generating, on the basis of first sampling data with a rotation angle of a joint section recorded with a first period, second sampling data with the rotation angle recorded with a second period longer than the first period.

Yet another aspect of the present invention provides a program for causing a processor to perform an operation, in which the operation includes generating, on the basis of first sampling data with a rotation angle of a joint section recorded with a first period, second sampling data with the rotation angle recorded with a second period longer than the first period.

BRIEF DESCRIPTION OF DRAWINGS

FIG. 2 is a block diagram illustrating a configuration example of a rotational driving section illustrated in FIG. 1.

DESCRIPTION OF EMBODIMENTS

Embodiments of the present invention will be described below in detail with reference to the attached drawings. Note that, in the present specification and drawings, components having substantially the same functional configurations are denoted by the same reference signs and that duplicate descriptions are omitted.

First Embodiment

Figure 1:
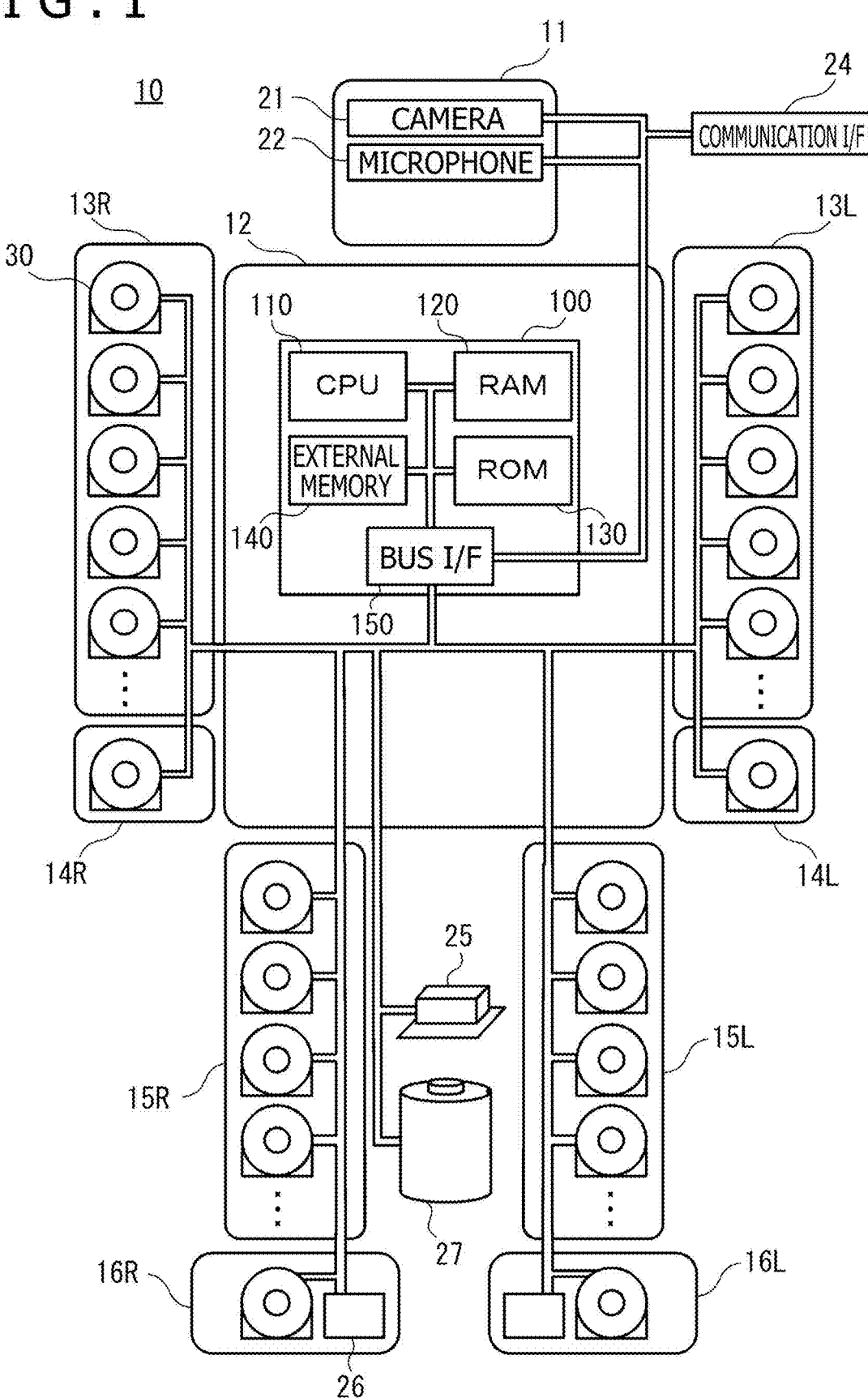
FIG. 1 is a diagram illustrating a hardware configuration example of a robot according to a first embodiment of the present invention.

FIG. 1 is a diagram illustrating a hardware configuration example of a robot according to a first embodiment of the present invention. In the illustrated example, a robot 10 includes an arithmetic apparatus 100 mounted in a main body section 12. The arithmetic apparatus 100 includes a CPU (Central Processing Unit) 110, a RAM (Random Access Memory) 120, a ROM (Read Only Memory) 130, an external memory 140, and the like. The arithmetic apparatus 100 determines an operation of the robot 10 according to image data acquired by a camera 21, sound data acquired by a microphone 22, a command signal received by a communication interface 24, or the like. The camera 21, the microphone 22, and the communication interface 24 are connected to the arithmetic apparatus 100 via a bus interface 150.

The arithmetic apparatus 100 controls the sections of the robot 10 in such a manner as to perform the determined operation. Specifically, to cause the determined operation to be executed, the arithmetic apparatus 100 controls a rotational driving section 30 provided in each of joint sections of arm sections 13L and 13R, hand sections 14L and 14R, leg sections 15L and 15R, and foot sections 16L and 16R. Although not illustrated in the drawings, a head section 11 and the main body section 12 may each be provided with the joint section and the rotational driving section 30. In this case, the arithmetic apparatus 100 references detected values from a distance measurement sensor (not illustrated), an inertia measurement apparatus (IMU: Inertial Measurement Unit) 25, a ground sensor 26, a load sensor (not illustrated), and a power supply control apparatus 27 as necessary. The rotational driving section 30, the distance measurement sensor, the IMU 25, the ground sensor 26, the load sensor, and the power supply control apparatus 27 are connected to the arithmetic apparatus 100 via the bus interface 150.

For example, when the CPU 110 selects a pattern corresponding to the determined operation from control patterns stored in the ROM 130 or the external memory 140, the arithmetic apparatus 100 sets foot section motion, a ZMP (Zero Moment Point) trajectory, core motion, upper limb motion, a waist horizontal position, a height, and the like according to the pattern, and transmits a control signal to the rotational driving section 30 according to these set values. In calculating the set values, the arithmetic apparatus 100 references rotation angle data regarding the joint section received from the rotational driving section 30.

FIG. 2 is a block diagram illustrating a configuration example of the rotational driving section illustrated in FIG. 1. In the illustrated example, the rotational driving section 30 includes an actuator 31 that rotationally drives the joint section, a rotation angle sensor 32 that detects the rotation angle of the joint section, and a processing circuit 33. The processing circuit 33 is, for example, a control apparatus implemented as firmware, and executes a predetermined operation in accordance with a program written in a memory. Specifically, the processing circuit 33 drives the actuator 31 according to the control signal received from the arithmetic apparatus 100, and samples the detected value from the rotation angle sensor 32 and transmits the detected value to the arithmetic apparatus 100 as rotation angle data for the joint section.

Here, as the rotation angle sensor 32, for example, a potentiometer, an optical encoder, a magnetic encoder, a magnetic sensor, a resolver, an inductive sensor, or an electrostatic sensor is used. An output from the rotation angle sensor 32 may be a continuous signal or a discrete signal. Sampling, by the processing circuit 33, of the detected value from the rotation angle sensor 32 may include, for example, quantizing the continuous signal with a predetermined period or counting the discrete signal with a predetermined period. In any case, the rotation angle of the joint section is recorded in the sampling data with the predetermined period.

As described above, the type of the rotation angle sensor 32 in the embodiments of the present invention is not limited to any particular type, and the magnetic sensor is used as an unlimited example. The magnetic sensor is a sensor that is a combination of a permanent magnet with an element that converts a change in magnetic field into an electric signal, such as a Hall element, an AMR (Anisotropic Magneto Resistive) element, a GMR (Giant Magneto Resistive) element, or a TMR (Tunnel Magneto Resistance) element. When a change occurs in the position of the permanent magnet attached to one of the members constituting the joint section, a magnetic field distribution changes, and this change is captured by the element attached to the other member and converted into an electric signal, allowing the rotation angle to be detected. Among the elements illustrated above, the TMR element has high output and high accuracy and is thus suitably used.

Figure 3:
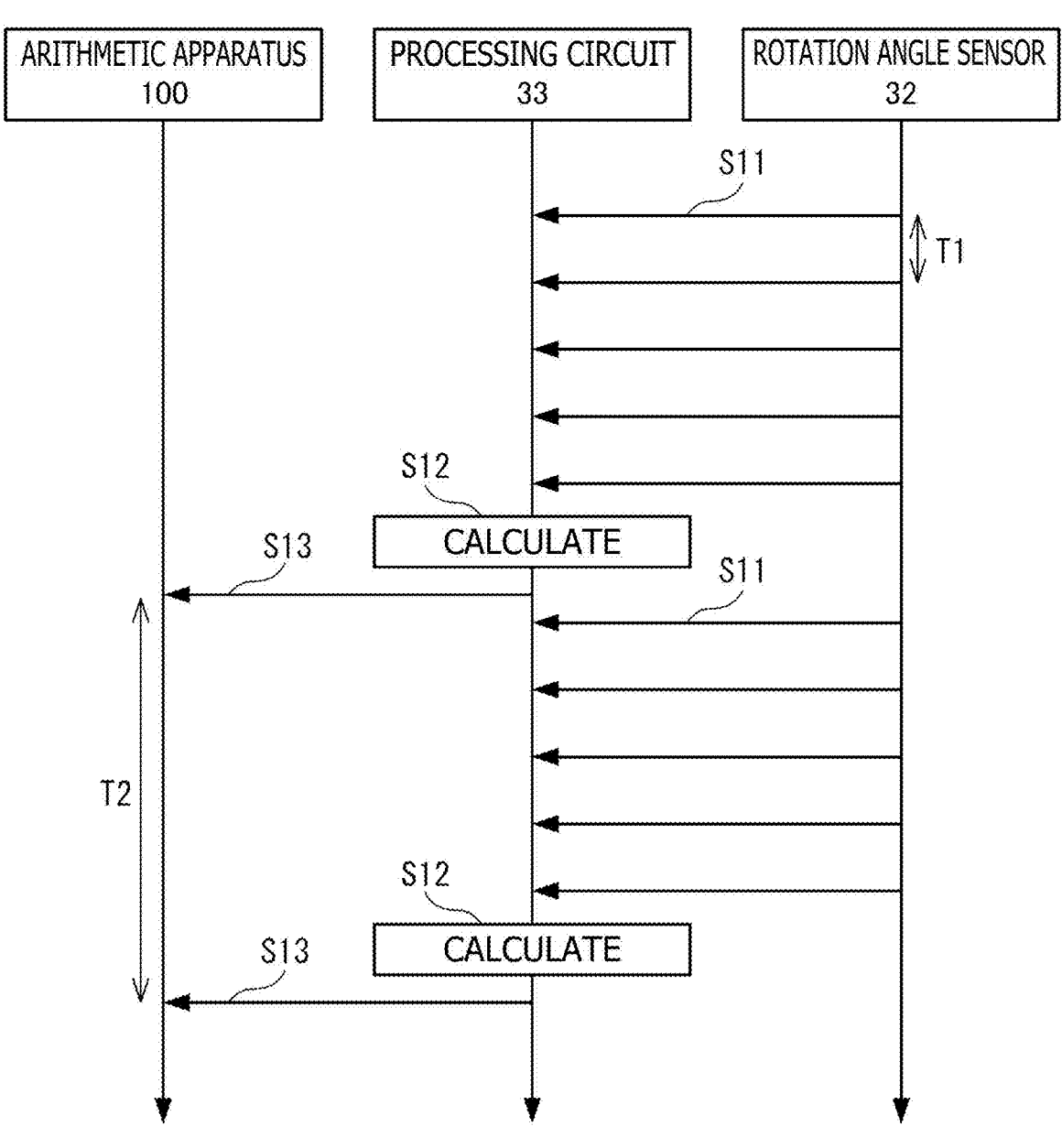
FIG. 3 is a sequence diagram illustrating an example of an operation of a processing circuit of the rotational driving section according to the first embodiment of the present invention.

FIG. 3 is a sequence diagram illustrating an example of an operation of the processing circuit of the rotational driving section in the first embodiment of the present invention. In the illustrated example, the processing circuit 33 samples the detected value from the rotation angle sensor 32 with a period T1 (step S11). Additionally, the processing circuit 33 transmits rotation angle data to the arithmetic apparatus 100 with a period T2 (step S13). Here, both the processing circuit 33 and the arithmetic apparatus 100 are apparatuses integrated into the robot 10. However, in a case where the processing circuit 33 is viewed as one control apparatus, the arithmetic apparatus 100 corresponds to an external apparatus. The period T2 with which rotation angle data is transmitted is determined according to a communication period or a bandwidth defined between the rotational driving section 30 and the arithmetic apparatus 100, and in the illustrated example, the period T2 is longer than the period T1. In an unlimited example, for the detected value, a sampling rate (inverse of the period T1) is 30 kHz, and a communication rate (inverse of the period T2) is 1 kHz.

In the description below, data generated in step S11 described above and in which the rotation angle is recorded with the period T1 is also referred to as first sampling data, and data generated in step S13 and in which the rotation angle is recorded with the period T2 is also referred to as second sampling data. The processing circuit 33 executes processing of generating, on the basis of the first sampling data with the rotation angle recorded with the shorter period T1, the second sampling data with the rotation angle recorded with the longer period T2. Specifically, this processing includes calculating the value of the rotation angle of the second sampling data from a plurality of values of rotation angle recorded during the period T2 as the first sampling data (step S12). More specifically, the above-described processing includes simply averaging, weighted-averaging, or time-sequentially smoothing a plurality of values of rotation angle recorded during the period T2.

Figure 4A:
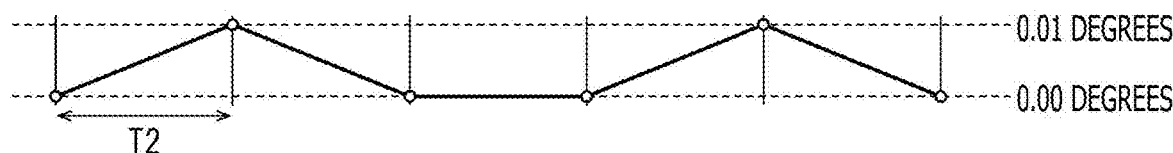
FIG. 4A is a diagram conceptually illustrating effects produced by the operation of the processing circuit of the rotational driving section according to the first embodiment of the present invention.
Figure 4B:
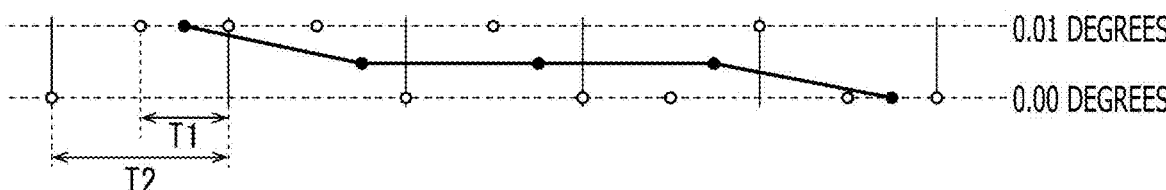
FIG. 4B is a diagram conceptually illustrating the effects produced by the operation of the processing circuit of the rotational driving section according to the first embodiment of the present invention.

FIG. 4A and FIG. 4B conceptually illustrate effects produced by the operation of the processing circuit of the rotational driving section in the first embodiment of the present invention. FIG. 4A illustrates a case where the detected value from the rotation angle sensor 32 is sampled with the same period T2 as that for communication. On the other hand, FIG. 4B illustrates a case where the detected value from the rotation angle sensor 32 is sampled with a period T1 shorter than the period T2 for communication and where two values of the rotation angle recorded with the period T1 are averaged to calculate a value of the rotation angle in the period T2. In the case illustrated in FIG. 4B, the values of the rotation angle to be output are more smoothed, and the rotation angle has a higher resolution. For the resolution, in the example in FIG. 4A, the rotation angle is detected in units of 0.01 degrees, whereas in the example in FIG. 4B, the rotation angle is output in units of 0.005 degrees.

Note that, for description, FIG. 4A and FIG. 4B illustrate simplified cases where the rotation angle varies between 0.00 degrees and 0.01 degrees and where the period T1 is half of the period T2 but that, in actuality, the rotation angle varies over a wider range and the relation between the periods T1 and T2 is more complicated. For example, the period T1 may be smaller than half of the period T2 (in the case of example of 30 kHz and 1 kHz described above, the period T1 is ⅟₃₀ of the period T2) and that the period T2 need not be an integral multiple of the period T1. According to the relation between the periods T1 and T2, a method for calculating the second sampling data from the first sampling data is appropriately selected, and for example, instead of the simple averaging, a method such as weighted averaging or time-sequential smoothing (low pass filtering) may be used.

In the first embodiment of the present invention described above, the rotational driving section 30 samples the detected value from the rotation angle sensor 32 with a period shorter than a period with which the rotational driving section 30 transmits rotation angle data to the arithmetic apparatus 100, and generates, according to the period of transmission, sampling data from the plurality of values of the rotation angle obtained by sampling. Thus, as described above, the values of the rotation angle can be smoothed, and the resolution can be increased. Such a configuration is effective, for example, in a case where there is a constraint on the communication period between the rotational driving section 30 and the arithmetic apparatus 100 (for example, the constraint that the period cannot be made shorter than the period T2) or where there is a constraint on a communication traffic (for example, the constraint that only one value of rotation angle can be transmitted per period T2). In these cases, the above-described configuration can improve the accuracy of the value of the rotation angle utilized by the arithmetic apparatus 100 overcoming the constraint on the communication period, the communication traffic, or the like.

For example, in a case where the magnetic sensor illustrated above is used as the rotation angle sensor 32, causes such as the effect of heat or external magnetism and aging may increase noise in the detected value or fluctuate the detected value regardless of an actual change in rotation angle. The configuration of the present embodiment as described above compensates for the effect of reduced accuracy of the detected value to allow the magnetic sensor to be used as the rotation angle sensor 32 in various external environments and over a long period of time. Such advantages are similarly provided by other types of sensors. Additionally, even with a rotation angle sensor that fails to provide a sufficient accuracy when the detected value is sampled with, for example, a period adapted to the communication period or the communication traffic (the period T2 in the example described above), by utilizing results of sampling of the detected value with a shorter period (the period T1 in the example described above), the arithmetic apparatus 100 may be able to read the rotation angle with a sufficient accuracy. In such a case, by utilizing a relatively inexpensive low-accuracy sensor, the costs of the robot 10 can be reduced.

Figure 5:
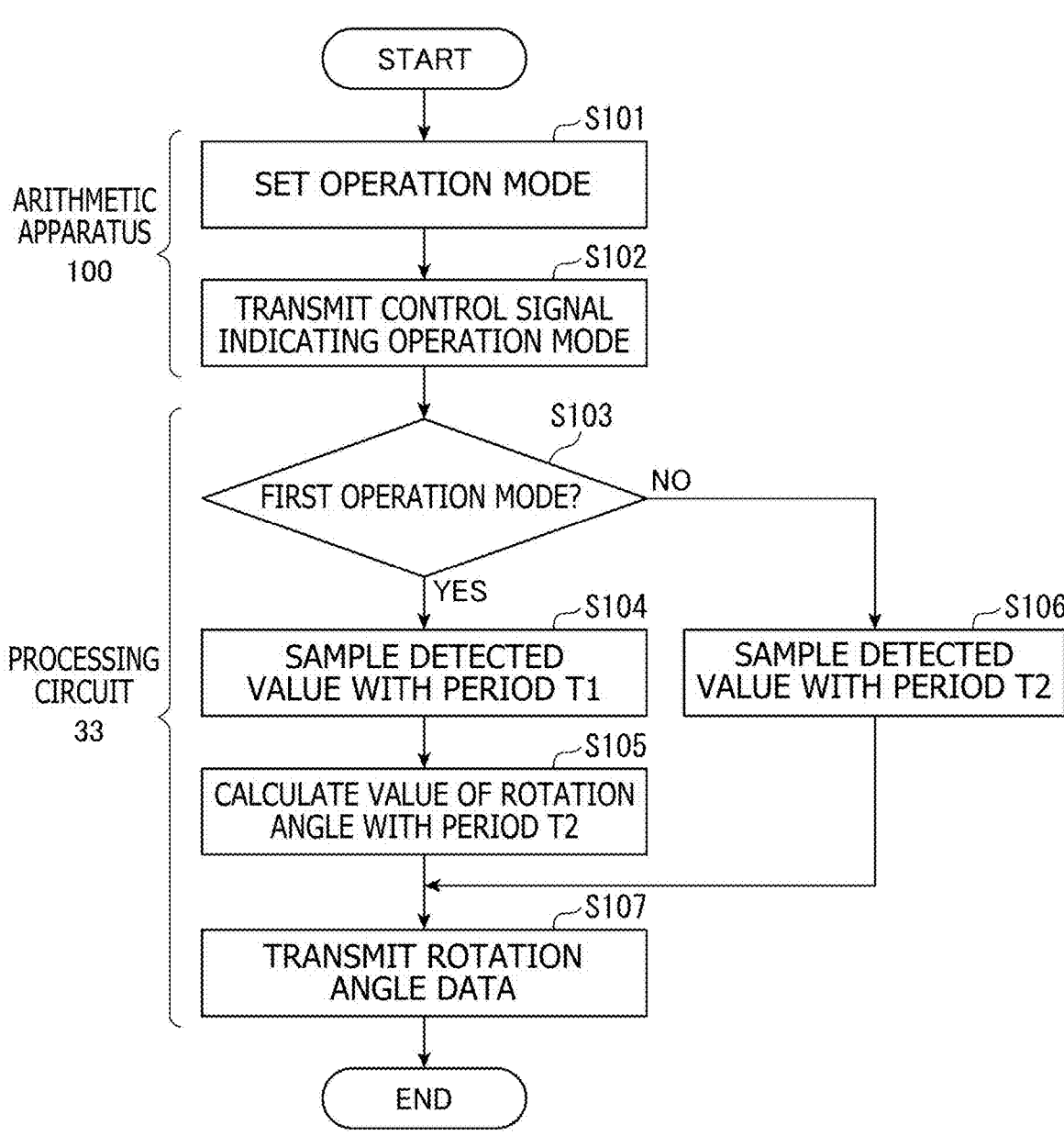
FIG. 5 is a flowchart illustrating an example of processing executed in a case where a sampling period is switched in the first embodiment of the present invention.

FIG. 5 is a flowchart illustrating an example of processing executed in a case where the sampling period is switched in the first embodiment of the present invention. In the illustrated example, the arithmetic apparatus 100 sets the operation mode (step S101), and transmits, to the rotational driving section 30, a control signal indicating the operation mode (step S102). In a case where the operation mode is the first operation mode (YES in step S103), the processing circuit 33 of the rotational driving section 30 samples the detected value from the rotation angle sensor 32 with the period T1 (step S104) as described above to generate first sampling data, and generates the second sampling data by calculating the value of the rotation angle in the period T2 from a plurality of values of the rotation angle recorded as the first sampling data. On the other hand, in a case where the operation mode is the second operation mode (NO in step S103), the processing circuit 33 samples the detected value from the rotation angle sensor 32 with the period T2 (step S106) to generate second sampling data. In any case, the processing circuit 33 transmits the generated second sampling data to the arithmetic apparatus 100 with the period T2 as rotation angle data (step S107).

The above-described configuration can be utilized, for example, in a case where the accuracy of the value of the rotation angle required for the arithmetic apparatus 100 varies depending on the state of the operation of the robot 10. In this case, the arithmetic apparatus 100 switches between the first operation mode and the second operation mode described above depending on the state of the operation of the robot 10. Specifically, in step S101 described above, the arithmetic apparatus 100 may set the first operation mode in which an accurate value of the rotation angle can be acquired in a case where the robot 10 is operating any joint section, and may set the second operation mode in which the value of the rotation angle has low accuracy but the rotational driving section 30 including the processing circuit 33 can cut power consumption in a case where the robot 10 is stationary.

Alternatively, the arithmetic apparatus 100 may determine the situation of the robot 10 with reference to detection results from the camera 21, the microphone 22, the IMU 25, the ground sensor 26, and the like, and set the operation mode according to the state. Specifically, upon determining, from the detection results from the camera 21, the ground sensor 26, and the like, that the robot 10 is moving on a rough terrain, the arithmetic apparatus 100 may set the first operation mode, and may otherwise set the second operation mode. The arithmetic apparatus 100 may, for example, set one of the above-described operation modes for the entire robot 10 or set the individual operation modes for a location including the operating joint section and for the other locations.

Additionally, in addition to dynamically switching the operation mode as described above, the arithmetic apparatus 100 may fixedly set the operation mode according to the location of the joint section provided with the rotational driving section 30 in a case where the processing circuit 33 can be operated in both the first operation mode and the second operation mode. Specifically, the first operation mode in which an accurate value of the rotation angle can be acquired may be set for lower-body joint sections of the robot 10 such as the leg sections 15L and 15R and the foot sections 16L and 16R for ambulation, and the second operation mode in which the value of the rotation angle has low accuracy but the power consumption can be reduced may be set for upper-body joint sections such as the arm sections 13L and 13R and the hand sections 14L and 14R. In a case where the application of the robot 10, specifically, whether or not there is an opportunity of ambulation, an action executed by the upper body, or the like is changed, the fixedly set operation mode may be switched.

Second Embodiment

Figure 6:
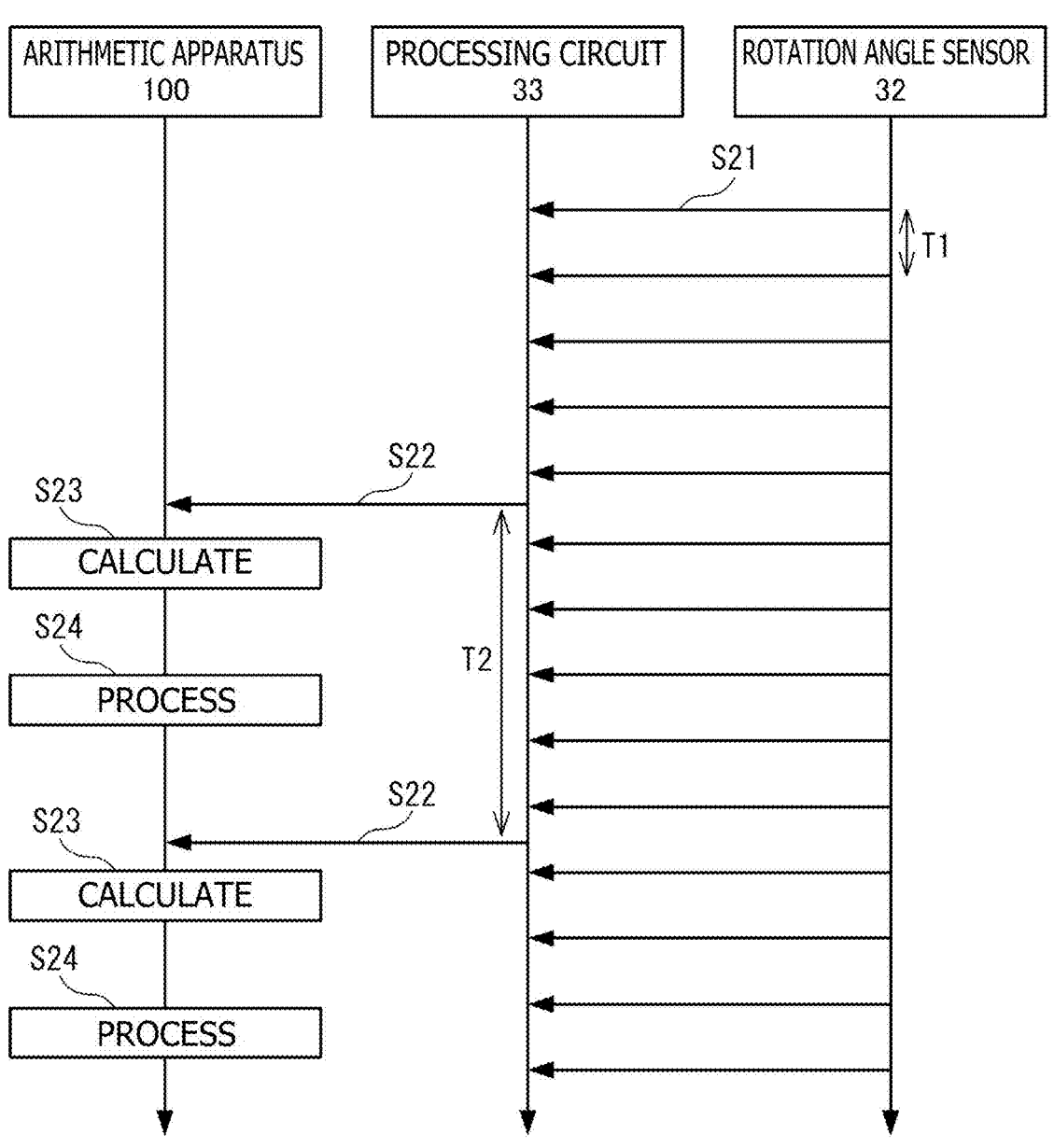
FIG. 6 is a sequence diagram illustrating an example of operations of a rotational driving section and an arithmetic apparatus in a second embodiment of the present invention.

FIG. 6 is a sequence diagram illustrating an example of operations of the rotational driving section and the arithmetic apparatus in the second embodiment of the present invention. In the present embodiment, in the robot 10 configured as in the case of the first embodiment described above, the arithmetic apparatus 100 functions as a control apparatus that generates second sampling data including the rotation angle recorded with the period T2 on the basis of first sampling data including the rotation angle recorded with the period T1. Note that the other configurations are similar to those in the first embodiment and the duplicate detailed descriptions are omitted.

In the illustrated example, the processing circuit 33 of the rotational driving section 30 samples the detected value from the rotation angle sensor 32 with the period T1 (step S21). Thus, first sampling data including the rotation angle recorded with the period T1 is generated. The processing circuit 33 transmits, to the arithmetic apparatus 100 during the period T2, a series of first sampling data generated after the last transmission (step S22). As is the case with the first embodiment, the processing circuit 33 and the arithmetic apparatus 100 are both apparatuses integrated into the robot 10. However, the processing circuit 33 corresponds to an external apparatus in a case where the arithmetic apparatus 100 is viewed as one control apparatus. The period T2 with which the rotation angle data is transmitted is determined according to the communication period defined between the rotational driving section 30 and the arithmetic apparatus 100. In the illustrated example, the period T2 is longer than the period T1. Note that, in the present embodiment, the bandwidth defined between the rotational driving section 30 and the arithmetic apparatus 100 is large enough to enable the series of first sampling data to be transmitted in each period T2.

Upon receiving the series of first sampling data transmitted from the processing circuit 33, the arithmetic apparatus 100 calculates the value of the rotation angle in the second sampling data from the value of the rotation angle in a series of the received first sampling data (step S23). More specifically, this processing may be similar to the processing described above in the first embodiment as step S12 in FIG. 3. The arithmetic apparatus 100 executes predetermined processing using the generated second sampling data (step S24). The predetermined processing includes, for example, calculating a set value to be transmitted to the rotational driving section 30 to drive the sections of the robot 10 as described above. However, the predetermined processing is not limited to this example. Steps S23 and S24 described above are repeated each time the series of first sampling data is received in each period T2 (step S22).

In the second embodiment of the present invention as described above, the arithmetic apparatus 100 executes the operation executed by the processing circuit 33 of the rotational driving section 30 in the first embodiment. Also in this case, as is the case with the first embodiment, the values of the rotation angle detected by the rotation angle sensor 32 can be smoothed, and the resolution can be increased. This allows the accuracy of the value of the rotation angle utilized by the arithmetic apparatus 100 to be improved overcoming the constraint on the communication period or the like.

Figure 7:
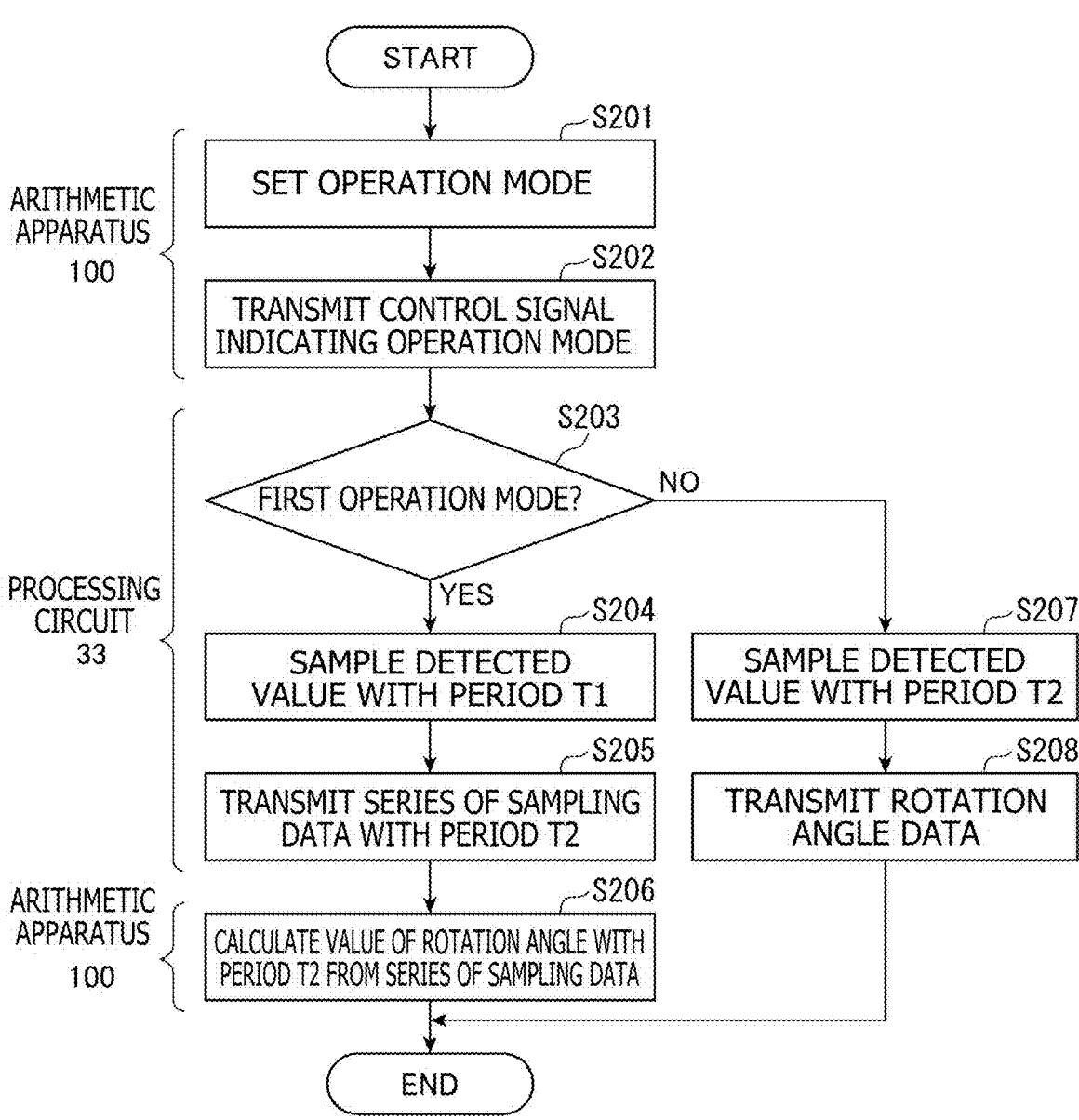
FIG. 7 is a flowchart illustrating an example of processing executed in a case where the sampling period is switched in the second embodiment of the present invention.

FIG. 7 is a flowchart illustrating an example of processing executed in a case where the sampling period is switched in the second embodiment of the present invention. In the illustrated example, the arithmetic apparatus 100 sets the operation mode (step S201), and transmits, to the rotational driving section 30, a control signal indicating the operation mode (step S202). In a case where the operation mode is the first operation mode (YES in step S203), the processing circuit 33 of the rotational driving section 30 samples the detected value from the rotation angle sensor 32 with the period T1 (step S204) to generate first sampling data, and transmits a series of first sampling data to the arithmetic apparatus 100 with the period T2 (step S205). The arithmetic apparatus 100 generates second sampling data by calculating the value of the rotation angle in the period T2 from the received series of first sampling data (step S206). On the other hand, in a case where the operation mode is the second operation mode (NO in step S203), the processing circuit 33 samples the detected value from the rotation angle sensor 32 with the period T2 (step S207) to generate second sampling data, and transmits the generated second sampling data to the arithmetic apparatus 100 with the period T2 as rotation angle data (step S208). In this case, the arithmetic apparatus 100 utilizes the received second sampling data as is.

As is the case with the example described with reference to FIG. 5 in the first embodiment, the above-described configuration can be utilized, for example, in a case where the accuracy of the value of the rotation angle required for the arithmetic apparatus 100 varies depending on the state of operation of the robot 10. In the example in FIG. 7, the longer sampling period in the second operation mode enables a reduction in the power consumption of the rotational driving section 30 including the processing circuit 33, and reduces the amount of calculation executed by the arithmetic apparatus 100, for example, allowing calculation resources to be passed to other processing operations executed by the arithmetic apparatus 100. As is the case with the first embodiment, the operation mode may be set for the entire robot 10 or may be individually set for each site of the robot 10. Additionally, the operation mode may be dynamically switched or may be fixedly set.

Figure 8:
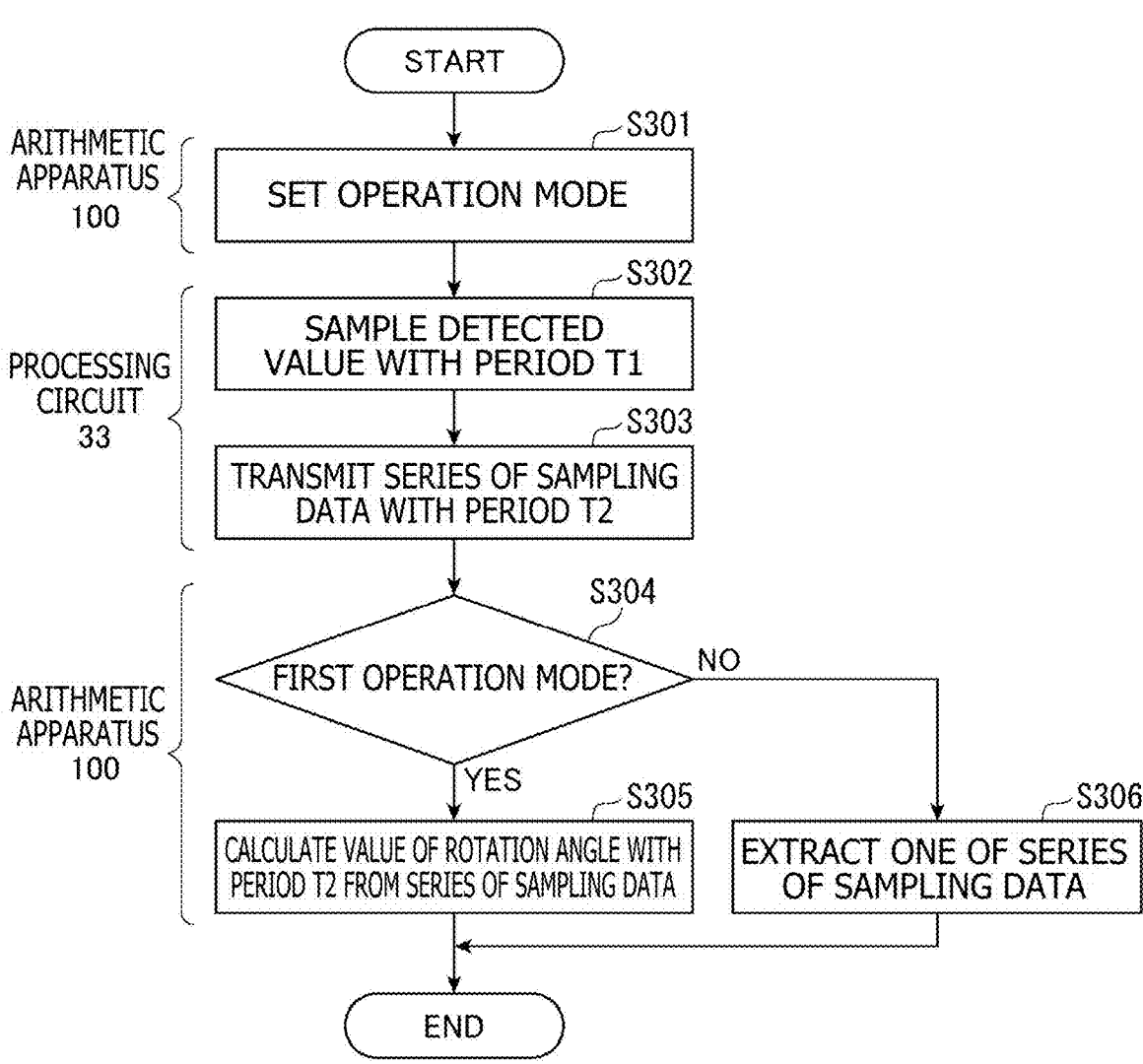
FIG. 8 is a flowchart illustrating an example of processing executed in a case where only the operation on the arithmetic apparatus side is switched in the second embodiment of the present invention.

FIG. 8 is a flowchart illustrating an example of processing executed in a case where only the operation on the arithmetic apparatus side is switched, in the second embodiment of the present invention. In the illustrated example, the arithmetic apparatus 100 sets the operation mode (step S301), but the operation mode is not transmitted to the processing circuit 33 of the rotational driving section 30. The processing circuit 33 generates first sampling data by sampling the detected value from the rotation angle sensor 32 with the period T1 regardless of the operation mode of the arithmetic apparatus 100 (step S302), and transmits a series of first sampling data to the arithmetic apparatus 100 with the period T2 (step S303). In a case where the set operation mode is the first operation mode (YES in step S304), the arithmetic apparatus 100 calculates the value of the rotation angle in the period T2 from the received series of first sampling data (step S305) to generate second sampling data. On the other hand, in a case where the operation mode is the second operation mode (NO in step S304), the arithmetic apparatus 100 extracts one of the values of the rotation angle in the received series of first sampling data (step S306) and uses the value as second sampling data. This processing differs from the processing in step S305 where the second sampling data is generated on the basis of the series of first sampling data in that those values of the rotation angle in the series of first sampling data which have not been extracted are discarded.

Compared to the example described above with reference to FIG. 7, in the example in FIG. 8, the rotational driving section 30 including the processing circuit 33 involves the same power consumption, but the arithmetic apparatus 100 executes a reduced amount of calculation in the second operation mode. Accordingly, the calculation resources can be passed to other processing operations executed by the arithmetic apparatus 100. The arithmetic apparatus 100 may set the same operation mode for the first sampling data received from all of the rotational driving sections 30 or set different operation modes for the respective locations of the rotational driving sections 30. Additionally, as is the case with the other examples described above, the operation mode may be dynamically switched or may be fixedly set.

Note that, in the example described above, the period T2 with which the arithmetic apparatus 100 receives the rotation angle data is the same as the period T2 with which the rotation angle is recorded in the second sampling data but that these periods may be different from each other. For example, the arithmetic apparatus 100 may receive a series of first sampling data with a period T3 different from the period T2 and generate second sampling data with the rotation angle recorded with the period T2. In this case, the period T3 with which the rotation angle data is transmitted is a communication period defined between the rotational driving section 30 and the arithmetic apparatus 100, and the period T2 with which the rotation angle data is recorded is, for example, the minimum period with the time resolution of the rotation angle in the arithmetic apparatus 100.

Additionally, in the embodiments described above, the processing circuit of the rotational driving section or the arithmetic apparatus in the robot functions as a control apparatus. However, in other embodiments, an intermediate control apparatus may be provided between the rotational driving section and the control apparatus of the robot and may operate as the control apparatus in the embodiment described above. The robot need not necessarily be a humanoid robot including arm sections and leg sections, and may be, for example, an industrial robot including only arm sections. Additionally, the control apparatus according to the embodiments of the present invention is not limited to a control apparatus intended to control the joint sections of the robot and can be intended to control joint sections of various machines or apparatuses other than robots.

The illustrative embodiments of the present invention have been described above in detail with reference to the attached drawings. However, the present invention is not limited to these examples. A person skilled in the art to which the present invention belongs could obviously arrive at variations or modifications without departing from the scope of technical concepts recited in claims. It is appreciated that the variations or modifications reasonably belong to the technical scope of the present invention.

REFERENCE SIGNS LIST

10: Robot
30: Rotational driving section
31: Actuator
32: Rotation angle sensor
33: Processing circuit
100: Arithmetic apparatus
110: CPU
130: ROM
140: External memory
150: Bus interface
T1: Period
T2: Period

The invention claimed is:

1. A control apparatus comprising:
a processor that executes an operation in accordance with a program, wherein the operation includes generating, on a basis of first sampling data with a detected value from a rotation angle sensor that detects a rotation angle of a joint section recorded with a first period, second sampling data with the rotation angle recorded with a second period longer than the first period, wherein:
the control apparatus is a processing circuit included in a rotational driving section provided in the joint section included in a machine or an apparatus, and
the operation further includes:
transmitting the second sampling data to an arithmetic apparatus in the machine or the apparatus with the second period, and
switching between a first operation mode in which the first sampling data is generated by sampling a detected value from the rotation angle sensor with the first period and in which the second sampling data is generated on a basis of the first sampling data and a second operation mode in which the second sampling data is generated by sampling the detected value from the rotation angle sensor with the second period.

2. The control apparatus according to claim 1, wherein the generating the second sampling data includes calculating a value of the rotation angle in the second sampling data from a plurality of values of the rotation angle recorded in the first sampling data during the second period.

3. The control apparatus according to claim 2, wherein the calculating the value of the rotation angle in the second sampling data includes simply averaging, weighted-averaging, or time-sequentially smoothing the plurality of values of the rotation angle.

4. The control apparatus according to claim 1, wherein:
the control apparatus is an arithmetic apparatus in a machine or an apparatus,
the operation includes receiving a series of the first sampling data from a processing circuit with the second period, the processing circuit being included in a rotational driving section provided in the joint section included in the machine or the apparatus, and
generating the second sampling data includes calculating the value of the rotation angle in one piece of the second sampling data from the values of the rotation angle in the series of the first sampling data.

5. The control apparatus according to claim 4, wherein the operation further includes executing predetermined processing using the second sampling data.

6. The control apparatus according to claim 4, wherein the operation further includes switching between a first operation mode in which the second sampling data is generated from the series of the first sampling data received from the processing circuit and a second operation mode in which the value of the rotation angle received from the processing circuit with the second period is utilized as the second sampling data.

7. The control apparatus according to claim 4, wherein the operation further includes switching between a first operation mode in which the second sampling data is generated from the series of the first sampling data received from the processing circuit and a second operation mode in which one of the values of the rotation angle in the series of the first sampling data received from the processing circuit is extracted and utilized as the second sampling data.

8. The control apparatus according to claim 1, wherein:
the operation includes receiving a series of the first sampling data from an external apparatus with a third period different from the second period, and
generating the second sampling data includes calculating the value of the rotation angle in one piece of the second sampling data from the values of the rotation angle in the series of the first sampling data.

9. The control apparatus according to claim 1, wherein; the joint section is a joint section of a robot, and switching is executed between the first operation mode and the second operation mode according to a state of operation of the robot.

10. A control method comprising:
by an operation executed by a processor in accordance with a program,
generating, on a basis of first sampling data with a detected value from a rotation angle sensor that detects a rotation angle of a joint section recorded with a first period, second sampling data with the rotation angle recorded with a second period longer than the first period,
wherein:
  the processor includes a rotational driving section provided in a joint section included in a machine or an apparatus, and
  the operation further includes:
    transmitting the second sampling data to an arithmetic apparatus in the machine or the apparatus with the second period, and
    switching between a first operation mode in which the first sampling data is generated by sampling a detected value from the rotation angle sensor with the first period and in which the second sampling data is generated on a basis of the first sampling data and a second operation mode in which the second sampling data is generated by sampling the detected value from the rotation angle sensor with the second period.

11. The control method of claim 10, wherein the generating the second sampling data includes calculating a value of the rotation angle in the second sampling data from a plurality of values of the rotation angle recorded in the first sampling data during the second period.

12. The control method of claim 10, wherein the calculating the value of the rotation angle in the second sampling data includes simply averaging, weighted-averaging, or time-sequentially smoothing the plurality of values of the rotation angle.

13. The control method of claim 10, wherein:
the processor further includes an arithmetic apparatus in a machine or an apparatus,
the operation includes receiving a series of the first sampling data from a processing circuit with the second period, the processing circuit being included in a rotational driving section provided in the joint section included in the machine or the apparatus, and
generating the second sampling data includes calculating the value of the rotation angle in one piece of the second sampling data from the values of the rotation angle in the series of the first sampling data.

14. The control method of claim 13, wherein the operation further includes executing predetermined processing using the second sampling data.

15. The control method of claim 13, wherein the operation further includes switching between a first operation mode in which the second sampling data is generated from the series of the first sampling data received from the processing circuit and a second operation mode in which the value of the rotation angle received from the processing circuit with the second period is utilized as the second sampling data.

16. The control method of claim 13, wherein the operation further includes switching between a first operation mode in which the second sampling data is generated from the series of the first sampling data received from the processing circuit and a second operation mode in which one of the values of the rotation angle in the series of the first sampling data received from the processing circuit is extracted and utilized as the second sampling data.

17. The control method of claim 10, wherein
the operation includes receiving a series of the first sampling data from an external apparatus with a third period different from the second period, and
generating the second sampling data includes calculating the value of the rotation angle in one piece of the second sampling data from the values of the rotation angle in the series of the first sampling data.

18. The control method of claim 10, wherein:
the joint section is a joint section of a robot, and
switching is executed between the first operation mode and the second operation mode according to a state of operation of the robot.

19. A control apparatus comprising:
a processor that executes an operation in accordance with a program, wherein the operation includes generating, on a basis of first sampling data with a detected value from a rotation angle sensor that detects a rotation angle of a joint section recorded with a first period, second sampling data with the rotation angle recorded with a second period longer than the first period,
wherein:
  the control apparatus is an arithmetic apparatus in a machine or an apparatus,
  the operation includes receiving a series of the first sampling data from a processing circuit with the second period, the processing circuit being included in a rotational driving section provided in the joint section included in the machine or the apparatus,
  the generating the second sampling data includes calculating the value of the rotation angle in one piece of the second sampling data from the values of the rotation angle in the series of the first sampling data, and
  the operation further includes switching between a first operation mode in which the second sampling data is generated from the series of the first sampling data received from the processing circuit and a second operation mode in which the value of the rotation angle received from the processing circuit with the second period is utilized as the second sampling data.

20. The control apparatus of claim 19, wherein the operation further includes executing predetermined processing using the second sampling data.

* * * * *